Figure 1:
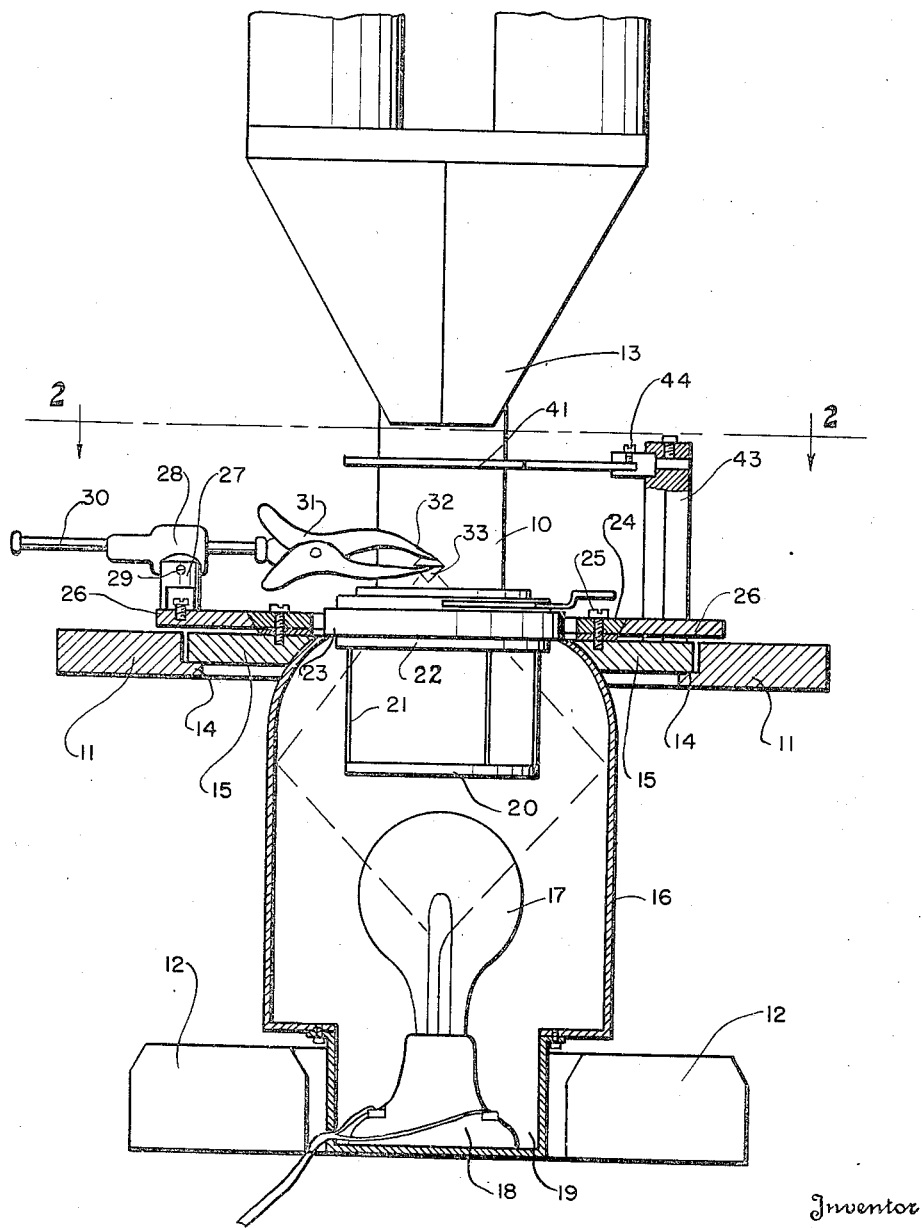

Jan. 10, 1950     H. L. WOODRUFF     2,494,078
APPARATUS FOR EXAMINING GEMS AND CRYSTALS
Filed April 26, 1948     2 Sheets-Sheet 1

Inventor
Harry L. Woodruff
By Ben. J. Chrosny
his Attorney

Jan. 10, 1950      H. L. WOODRUFF      2,494,078
APPARATUS FOR EXAMINING GEMS AND CRYSTALS
Filed April 26, 1948      2 Sheets—Sheet 2
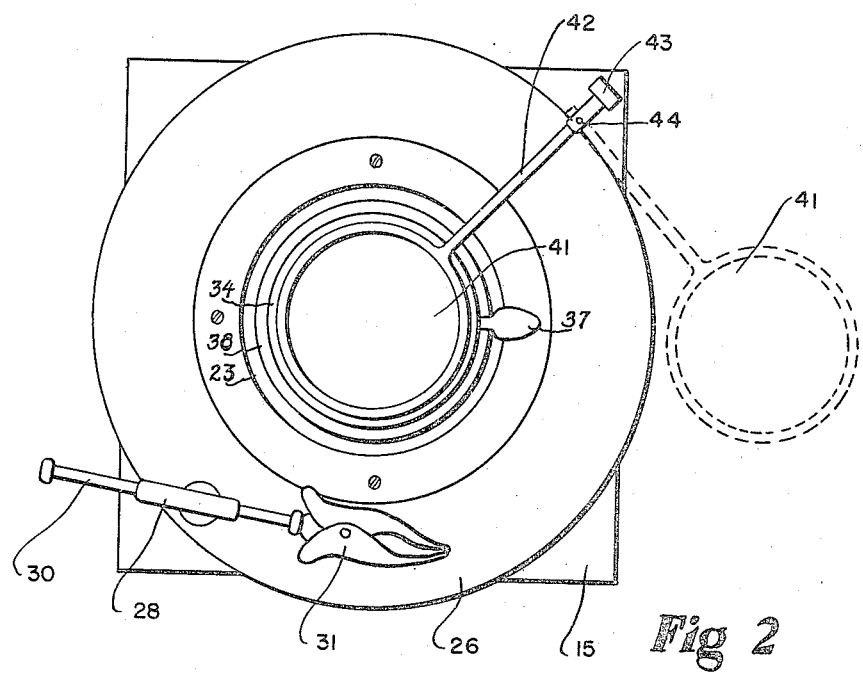
Fig 2
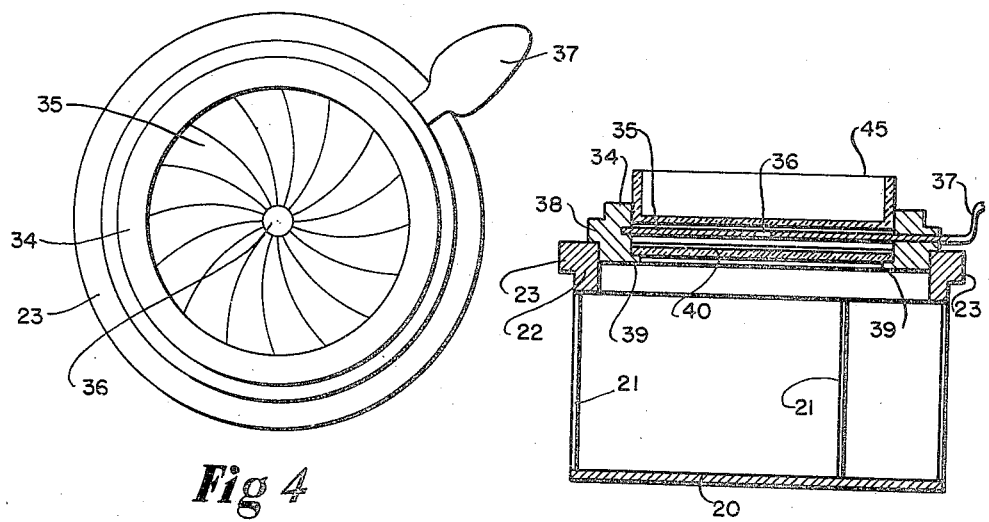
Fig 4
Fig 3
Inventor
Harry L. Woodruff
By Ben. J. Chromy
his attorney Patented Jan. 10, 1950

2,494,078

UNITED STATES PATENT OFFICE 2,494,078

APPARATUS FOR EXAMINING GEMS AND CRYSTALS

Harry L. Woodruff, Washington, D. C.

Application April 26, 1948, Serial No. 23,317

3 Claims. (Cl. 88—14)

This invention relates to an illumination apparatus adapted to be used with a microscope for examination of gems and crystals.

An object of this invention is to provide an improved illuminator of relatively simple and inexpensive design adapted to be used for examination of gems and crystals.

Another object of this invention is to provide an improved illuminator of the dark field type adapted to be used for the examination of gems and crystals.

Still another object of this invention is to provide an illumination device of the dark field type for examination of gems and crystals, the illuminating device being positioned in a housing that is attached to a frame that may be slidably positioned upon the stage support of a microscope.

A further object of this invention is to provide an illumination device having a housing that is rigidly attached to the rotatable stage support of a gem and crystal examining microscope.

Other and further objects of this invention will be apparent to those skilled in the art to which it relates from the following specification, claims and drawings.

Referring to the drawings, briefly, Figure 1 is a view in partial section showing an embodiment of this invention; Figure 2 is a view of the top of the stage taken along the line 2—2 of Figure 1; Figure 3 is a detailed view in vertical section of the ring supporting the direct illumination mask over the light bulb and also the iris and the light polarizing element support; Figure 4 is a view showing the top of the element shown in Figure 3.

In Figure 1 this improved illuminator is shown in position for use with a binocular microscope having a back member 10 to which are attached the stage support 11, the U-shaped foot 12 and the adjustable optical system 13 of the binocular type. The stage support 11 is recessed to provide a flange 14 for slidably supporting the flat plate 15 which may be removed from the stage support by sliding it to the front.

The lamp housing 16 is provided with a circular opening at the top thereof and the surface adjacent to this opening is soldered, brazed or otherwise attached to surfaces surrounding a corresponding hole formed in the plate 15. Thus the lamp housing 16 may be suspended from the plate 15 and the stage support 11 of the microscope. The lamp 17 may be of conventional incandescent 110 volt type or it may be of any other type desired such as the mercury vapor quartz lamp for giving light extending into the ultra violet part of the spectrum. The lamp 17 is screwed into the socket 18 that is positioned in the bottom part of the housing 19 that is detachably attached to the bottom of the lamp housing 16 so that the lamp may be readily removed and replaced. The housing portion 19 is made to fit into the opening between the U-shaped members 12 as illustrated.

The mask 20 is supported by the wires 21 a short distance above the lamp 17 so as to prevent direct light rays from proceeding from the filament of the lamp 17 upward through the opening at the top of the housing 16. Only reflected light rays are permitted to go from the lamp 17 upward to this opening and the inside of the housing 16 may be painted with highly reflecting paint such as aluminum bronze to reflect the light from the side walls on the inside of the housing 16 upward through the housing opening.

Wires 21 supporting the mask 20 are attached to the ring 22 that is provided with a shoulder 23 for engaging the lip of the mouth of the housing 16. The top surface of the mask 20 is painted with a dull black paint to minimize reflection therefrom. The ring 24 is attached to the plate 15 by means of the screws 25 so that the opening in this ring surrounds the ring 22. The outer surface of the ring 24 is beveled to cooperate with the inner beveled surface of the rotatable ring 26. The ring 26 carries a gem support consisting of a post 27 attached to this ring by suitable screws, a sleeve 28 pivoted to the post 27 by the pin 29, a slidable rod 30 sliding in the sleeve 28 and a gem engaging clip 31 attached to one end of the slidable rod 30. The gem engaging clip 31 is provided with tongs 32 for clinching the gem 33. The post 27 may be rotated so that the gem holding clip 31 may be swung in an arc over the rotatable ring 26 so that the gem 33 may be brought into the desired position under the microscope objectives. The rod 30 attached to the gem clip 31 also may be rotated so that the gem 33 may be rotated in a vertical arc underneath the microscope objectives. Furthermore, the sleeve 28 may be tilted in a vertical arc so that the gem 33 may be moved up and down and properly positioned under the microscope objectives and in the reflected light from the lamp 17.

Another ring 34 into which is fitted iris 35, the opening 36 of which is adjustable by means of the lever 37, is adapted to be positioned over the ring 22. The ring 34 is also provided with a flange 38 that is adapted to engage the top surface of the ring 22. Suitable fins 39 are provided to the bottom of the hole of the ring 34 which support a light polarizing element 40 of the "Polaroid" type. Other color filters that are not polarizing may be inserted in place of the light polarizing element 40 if desired. The light polarizing element 40 functions to polarize the light from the lamp 17 before this light is transmitted to the gem 33 through the opening 36 of the iris. The ring 34 supporting the "Polaroid" 40 may be rotated so that the "Polaroid" 40 is at right angles to a second "Polaroid" element 41 that functions as an analyzer element. The light polarizing element 41 is supported by the arm 42 that is pivotly attached to the post 43 by the pin 44 whereby this light polarizing element 41 may be swung in and out from under the microscope objectives. For this purpose the post 43 is attached to one of the corner portions of the plate 15 as shown in Figures 1 and 2.

A gem or crystal 33 supported by the holder 32 may be suitably positioned in the light reflected from the inner walls of the lamp housing 16 so that the optical properties of the gem or crystal 33 may be thoroughly examined and determined. For this purpose the holder 32 may be provided with suitable gem gripping tines, so that light may pass through the gem or crystal without being cut off or being obstructed by these tines. As previously described the holder 32 may be moved sidewise, up and down and it also may be rotated so that the gem 33 may be examined from various sides without removing it from the holder 32. Furthermore, the holder 32 is supported on the rotatable ring 26 that is rotatable independently of any rotation imparted to the light polarizing element 40 and in this manner the light polarizing and dichroism of the gem or crystal may be determined. For this purpose the circumference of the ring 26 may be provided with degree calibrations ranging from 0-360 degrees so that the angles at which light extinction is produced particularly in crystals may be determined. Furthermore, the light polarizing element 40 may be rotated independently of the gem or crystal holder 32 so that this light polarizing element may be set at right angles to the light polarizing element 41 or it may be set parallel to the light polarizing element 41 if desired.

The entire unit including the lamp housing 16, the rotatable ring 26 and the polarizing elements 40 and 41, as well as the holder 32 are supported by the plate 15 which may be removed from the stage 11 of the microscope and is supported by the shoulder 14 of the stage 11. As a result, other apparatus may be placed on the stage 11 if desired. Furthermore, a small glass dish 45 with an optically flat bottom free of strains may be provided for examination of gems or crystals immersed in liquids.

While I have described this invention in detail with respect to the embodiment illustrated it is, of course, to be understood that modifications therein may be made without departing from the invention and I do not therefore desire to limit the invention to the exact details described and illustrated except insofar as they are defined by the claims.

What I claim is:

1. Apparatus for the examination of gems and crystals and adapted to be used with a microscope and removably supported on the stage of the microscope as a unit, comprising a lamp, a housing for said lamp, said housing having an opening at the top thereof, a plate having an opening therein substantially concentric with said housing opening, means for attaching said housing to said plate, said plate being of such size as to removably fit into the recess of the stage of the microscope so that said lamp housing is supported beneath the microscope stage and light is projected upward from said lamp through said openings, a rotatable ring supported by said plate, said rotatable ring being substantially concentric with said openings, a second ring removably and rotatably positioned in said openings, a light polarizing element positioned in said second ring to polarize the light transmitted out of said lamp housing by said lamp, an adjustable gem and crystal holder attached to said first mentioned rotatable ring for holding the gems and crystals in different positions over said light polarizing element in the field of the optical system of the microscope, a second light polarizing element adapted to be positioned above said gem and crystal holder so that the gems and crystals may be supported and rotated between both of said light polarizing elements, and an arm pivoted to said plate for holding said second light polarizing element so that said second light polarizing element may be swung into position over the gems or crystals being examined.

2. Apparatus for the examination of gems and crystals adapted to be used with a microscope and removably supported on the stage of the miscroscope as a unit, comprising a lamp, a housing for said lamp, said housing having an opening at the top thereof, a plate having an opening therein substantially concentric with said housing opening, means for attaching said housing to said plate, said plate being of such size as to removably fit into the recess of the stage of the microscope so that said lamp housing is supported beneath the microscope stage and light is projected upward from said lamp through said openings, a rotatable ring supported by said plate, said rotatable ring being substantially concentric with said openings, a second ring removably and rotatably supported in said openings, a light polarizing element positioned in said second ring to polarize the light transmitted out of said lamp housing by said lamp, an opaque plate, means attached to said second ring for supporting said opaque plate in said housing and over said lamp to prevent direct light from passing out of said housing opening, an adjustable gem and crystal holder attached to said first mentioned rotatable ring for holding the gems and crystals in different positions over said light polarizing element, a second light polarizing element adapted to be positioned over said gem and crystal holder so that the gems and crystals may be supported and rotated between both of said light polarizing elements, and an arm pivoted to said plate for holding said second light polarizing element so that said second light polarizing element may be swung into position over the gem or crystal being examined.

3. Apparatus for the examination of gems and crystals adapted to be used with a microscope and removably supported on the stage of the microscope as a unit, comprising a lamp, a housing for said lamp, said housing having an opening at the top thereof, a plate having an opening therein in substantially the same size as said housing opening, means for attaching said housing to said plate so that said openings are substantially concentric, said plate being of such size as to removably fit into the recess of the stage of the microscope so that said lamp housing is supported beneath the microscope stage and light is projected upward from said lamp through said openings, a rotatable ring supported by said plate, said rotatable ring being substantially concentric with said openings, a second ring removably and rotatably supported in said openings, a plurality of depending members attached to the bottom of said second ring and extending into said housing, an opaque plate supported by said depending members over said lamp to prevent direct light rays from passing through said openings from said lamp, a light polarizing element positioned in said second ring to polarize the light transmitted out of said lamp housing by said lamp, an adjustable gem and crystal holder attached to said first mentioned rotatable ring for holding the gems and crystals in different positions over said light polarizing element, a second light polarizing element adapted to be positioned over said gem and crystal holder so that the gems and crystals may be supported and rotated between both of said light polarizing elements, and an arm pivoted to said plate for holding said second light polarizing element so that said second light polarizing element may be swung into position over the gem or crystal being examined.

HARRY L. WOODRUFF.

REFERENCES CITED

The following references are of record in the file of this patent:

UNITED STATES PATENTS

| Number | Name | Date |
| --- | --- | --- |
| 1,700,497 | Heitzler | Jan. 29, 1929 |
| 1,766,037 | Dawson | June 24, 1930 |
| 1,894,132 | Stone | Jan. 10, 1933 |
| 2,157,437 | Shipley | May 9, 1939 |
| 2,410,621 | Babbitt | Nov. 5, 1946 |
| 2,435,953 | Bennett | Feb. 17, 1948 |